(12) United States Patent
Jacobs

(10) Patent No.: US 9,113,026 B2
(45) Date of Patent: Aug. 18, 2015

(54) METHOD AND APPARATUS FOR GAIN AND LEVEL CORRECTION OF MULTI-TAP CCD CAMERAS

(71) Applicant: RAYTHEON COMPANY, Waltham, MA (US)

(72) Inventor: Trent Jacobs, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 1 day.

(21) Appl. No.: 14/103,947

(22) Filed: Dec. 12, 2013

(65) Prior Publication Data

US 2014/0240558 A1    Aug. 28, 2014

Related U.S. Application Data

(60) Provisional application No. 61/770,505, filed on Feb. 28, 2013.

(51) Int. Cl.
*H04N 5/232*    (2006.01)
*H04N 5/243*    (2006.01)
*H04N 5/361*    (2011.01)
(Continued)

(52) U.S. Cl.
CPC ........... *H04N 9/045* (2013.01); *H04N 5/23258* (2013.01); *H04N 5/243* (2013.01); *H04N 5/361* (2013.01); *H04N 5/3653* (2013.01)

(58) Field of Classification Search
CPC . H04N 5/243; H04N 5/3653; H04N 5/23258; H04N 5/361
USPC .......................................... 348/316, 321, 323
See application file for complete search history.

(56) References Cited

U.S. PATENT DOCUMENTS

| 5,737,015 | A   | 4/1998 | Juen |
| 6,791,615 | B1* | 9/2004 | Shiomi et al. ................. 348/323 |
| 7,236,199 | B2  | 6/2007 | Hori et al. |

(Continued)

FOREIGN PATENT DOCUMENTS

| EP | 1 033 868 A1 | 9/2000 |
| EP | 1 246 453 A2 | 10/2002 |

OTHER PUBLICATIONS

Notification of Transmittal of the International Search Report and the Written Opinion of the International Searching Authority from corresponding PCT/US2013/074532 dated Mar. 17, 2014.

(Continued)

*Primary Examiner* — Gevell Selby
(74) *Attorney, Agent, or Firm* — Lando & Anastasi, LLP

(57) ABSTRACT

According to one aspect, embodiments herein provide a CCD sensor comprising a pixel array having a first segment configured to produce a first tap signal responsive to receipt of electromagnetic radiation from a scene to be imaged, a second segment configured to produce a second tap signal responsive to receipt of the electromagnetic radiation from the scene, a region of interest including a portion of the first segment adjacent the second segment and a portion of the second segment adjacent the first segment, and a processor configured to receive the first and second tap signals, perform level correction on one of the first and second tap signals based on magnitudes of the first and second tap signals, and perform gain correction on one of the first and second tap signals based on a comparison between magnitudes of the first and second tap signals corresponding to the region of interest.

25 Claims, 3 Drawing Sheets

(51) Int. Cl.
*H04N 9/04* (2006.01)
*H04N 5/365* (2011.01)

(56) References Cited

U.S. PATENT DOCUMENTS

| | | | |
|---|---|---|---|
| 7,295,238 B2* | 11/2007 | Tanaka et al. | 348/316 |
| 2003/0090577 A1 | 5/2003 | Shirakawa | |
| 2003/0164885 A1 | 9/2003 | Tanaka et al. | |
| 2004/0218063 A1 | 11/2004 | Hattori et al. | |
| 2005/0007475 A1* | 1/2005 | Hori et al. | 348/321 |
| 2006/0066737 A1 | 3/2006 | Yokohata et al. | |
| 2006/0092482 A1 | 5/2006 | Yano et al. | |
| 2006/0197853 A1 | 9/2006 | Miyashita | |
| 2007/0076107 A1 | 4/2007 | Nishimura | |
| 2008/0089599 A1 | 4/2008 | Hagiwara | |
| 2008/0158397 A1* | 7/2008 | Hayakawa | 348/274 |
| 2009/0021606 A1 | 1/2009 | Kuruma et al. | |
| 2009/0079859 A1 | 3/2009 | Hagiwara | |

OTHER PUBLICATIONS

Truesense Imaging, Inc., "Seam Correction for Sensors With Multiple Outputs", Aug. 23, 2012, Reference Document, Revision 1.0 PS-0065, 13 pages.

Basler Vision Technologies, "Basler Optimizes Automatic Channel Balancing on pilot Series Cameras for High Quality Imaging Results", Pilot Tap Balance White Paper, 4 pages.

* cited by examiner

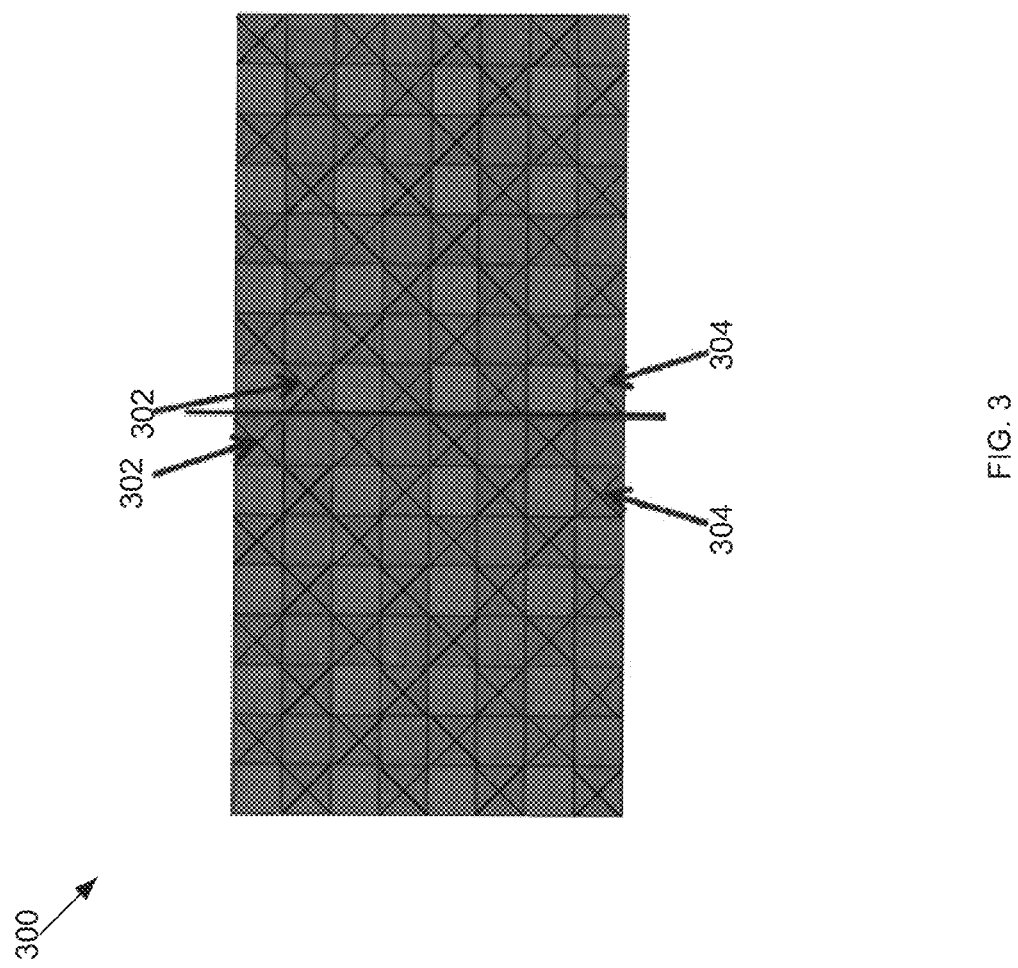

METHOD AND APPARATUS FOR GAIN AND LEVEL CORRECTION OF MULTI-TAP CCD CAMERAS

CROSS-REFERENCE TO RELATED APPLICATIONS

This application claims priority under 35 U.S.C. §119(e) to U.S. Provisional Application No. 61/770,505, entitled "METHOD AND APPARATUS FOR GAIN AND LEVEL CORRECTION OF BAYER COLOR MULTI-TAP CCD CAMERAS," filed Feb. 28, 2013, which is hereby incorporated by reference in its entirety for all purposes.

FEDERALLY SPONSORED RESEARCH

This invention was made with U.S. government support under a grant awarded by the Department of Defense (Grant No. Withheld). The U.S. government has certain rights in this invention.

BACKGROUND

Charge coupled device (CCD) cameras are commonly used in digital imaging systems. Multi-tap CCD cameras split an image frame into two or more areas that are read out from the CDD camera in parallel. For example, an image frame of a multi-tap CCD camera may be divided into left and right halves, and the pixels in each half are read out from each half in parallel electrical paths. These multi-tap CCD cameras exhibit inherent response errors between the readouts of the different paths. For example, PVT (process, voltage, and/or temperature) variations in each path may produce errors. As a result, there may be differences in the gain and/or black levels of each group of individually read out pixels from each path.

As a result of poor tap/channel matching between paths of the multi-tap CCD camera, the difference in the pixels read out from each path may result in a "split screen" visual effect when the pixels from each path are combined into a single image. In an image exhibiting a "split screen" visual effect, a relatively clean line of demarcation exists in the image between pixels read out from each half of the image frame, as a result of the differences in the pixels read out from each path. Digital image processing also typically performs contrast-enhancing and/or peaking operations on the image frame which may increase the error(s) between pixels from each path.

Conventionally, errors between parallel readouts in multi-tap CCD cameras are addressed though single-point or multi-point factory calibration performed by the camera vendor. For example, one approach has been to attempt to minimize tap-based errors by performing a simple level calibration, assuming a generally-well balanced camera as an initial condition.

Some factory calibration approaches manipulate digital controls of the analog to digital converters associated with the pixels. For example, U.S. Pat. No. 7,236,199 (hereinafter the '199 patent) discloses performing automated tap balance within a CCD camera by controlling the analog to digital converter dynamically. In this method, gain resolution is limited by the control resolution and PVT variance of the analog to digital converter, and as a result, the minimum gain error is at least several digital counts. In addition, the method disclosed in the '199 patent requires the CCD sensor to be shrouded to perform level calibration.

SUMMARY OF INVENTION

Aspects and embodiments described herein are directed to methods and apparatus for providing tap balance, also referred to as tap/channel matching, in a multi-readout (or multi-tap) CCD sensor. According to certain embodiments, level (offset) and gain errors between readouts may be reduced to one digital count or less. This also addresses the undesirable "split screen" visual effect that can arise from poor tap/channel matching.

For example, aspects and embodiments described herein provide "one shot" level correction and a continuous PID (proportional-integral-derivative) gain correction control loop. Through the control loop, the gain error may be accurately tracked with PVT variances. As discussed further below, in one embodiment, a method of channel matching includes measuring gradients at a tap seam within a pre-defined region, and producing a gain correction term based on the gradients. The method may also include filtering the scene data to address scene-based gradients that can contaminate the gain error, thereby achieving a more accurate gradient term. The method may also include selectively enabling gain correction only when scene motion is large enough to ensure new samples within the predefined region.

Embodiments of the methods discussed herein may achieve tighter gain matching than is possible using conventional analog to digital controls (such as disclosed in the '199 patent, for example, as discussed above) alone by providing higher resolution gain control. Additionally, unlike conventional methods such as disclosed in the '199 patent, embodiments of the methods disclosed herein do not require the CCD sensor to be masked or shrouded to perform black level correction. Furthermore, embodiments of the methods disclosed herein may be used on CCD sensors with color filter arrays as well as on monochrome sensors.

Aspects in accord with the present invention are direct to a Charge Coupled Device (CCD) sensor for capturing scene imagery, the CCD sensor comprising a pixel array comprising a first segment including a first plurality of pixels, the first segment configured to produce a first tap signal responsive to receipt of electromagnetic radiation from a scene to be imaged, a second segment including a second plurality of pixels, the second segment configured to produce a second tap signal responsive to receipt of the electromagnetic radiation from the scene, a region of interest including a portion of the first segment adjacent the second segment and a portion of the second segment adjacent the first segment, and a processor coupled to the first and second segments, wherein the processor is configured to receive the first tap signal from the first segment and the second tap signal from the second segment, perform level correction on one of the first tap signal and the second tap signal based on a magnitude of the first tap signal and a magnitude of the second tap signal, and perform gain correction on one of the first tap signal and the second tap signal based on a comparison between a magnitude of the first tap signal corresponding to the region of interest and a magnitude of the second tap signal corresponding to the region of interest.

According to one embodiment, the first segment includes a first reference region, the second segment includes a second reference region, and the processor is further configured to receive at least one first reference tap signal from the first reference region, to receive at least one second reference tap signal from the second reference region, and to perform the level correction of the one of the first tap signal and the second tap signal based on a comparison between a magnitude of the at least one first reference tap signal and a magnitude of the at least one second reference tap signal.

According to another embodiment, in performing the level correction of the one of the first tap signal and the second tap signal the processor is further configured to sum the magnitude of each first reference tap signal from the first reference region, sum the magnitude of each second reference tap signal from the second reference region, calculate a difference between the summed first reference tap signal magnitudes and the summed second reference tap signal magnitudes, and add the difference to the magnitude of the one of the first tap signal and the second tap signal.

According to one embodiment, in performing the gain correction of the one of the first tap signal and the second tap signal the processor is configured to select pixel pairs, each pair including a pixel from the first segment within the region of interest and a pixel from the second segment within the region of interest, calculate a tap signal magnitude gradient for each pixel pair, and sum at least a portion of the tap signal magnitude gradients over the region of interest to generate an error term.

According to another embodiment, the processor includes a Proportional-Integral Derivative (PID) controller configured to generate a gain correction term based on the error term, and wherein the processor is further configured to adjust a gain of the one of the first tap signal and the second tap signal based on the gain correction term. In one embodiment, the processor is further configured to compare each tap signal magnitude gradient of each pixel pair to a gradient threshold, and to only sum tap signal magnitude gradients less than the gradient threshold to generate the error term. In another embodiment, the pixel array is color filtered, and wherein the processor is further configured to select the pixel pairs from pixels of the same color in the first and second segments. In one embodiment, the pixel array is Bayer color filtered.

According to one embodiment, the processor further includes a motion input line configured to be coupled to a motion system, and wherein the processor is further configured to receive motion signals from the motion system via the motion input line including information regarding motion of the scene imagery, and to perform gain correction of the one of the first tap signal and the second tap signal only when the motion signals indicate that the scene imagery has moved by more than a scene motion threshold.

One aspect in accord with the present invention is directed to a method of providing tap balance in a multi-tap CCD camera, the CCD camera comprising a pixel array including a first segment including a first plurality of pixels, a second segment including a second plurality of pixels, and a region of interest including a portion of the first segment adjacent the second segment and a portion of the second segment adjacent the first segment, the method comprising receiving a readout from the first segment including a first tap signal representative of electromagnetic radiation received by the first segment from a scene to be imaged, receiving a readout from the second segment including a second tap signal representative of electromagnetic radiation received by the second segment from the scene, adjusting a magnitude of the first tap signal based on a magnitude of the second tap signal, and adjusting a gain applied to one of the first tap signal and the second tap signal based on a comparison between a magnitude of the first tap signal corresponding to the region of interest and a magnitude of the second tap signal corresponding to the region of interest.

According to one embodiment, receiving a readout from the first segment includes receiving at least one first reference tap signal, receiving a readout from the second segment includes receiving at least one second reference tap signal, and adjusting the magnitude of the first tap signal includes adjusting the magnitude of the first tap signal based on a comparison between a magnitude of the at least one first reference tap signal and a magnitude of the at least one second reference tap signal.

According to another embodiment, adjusting the magnitude of the first tap signal further includes summing the magnitude of each first reference tap signal, summing the magnitude of each second reference tap signal, calculating a level difference between the summed first reference tap signal magnitudes and the summed second reference tap signal magnitudes, and adding the level difference to the magnitude of the first tap signal. In one embodiment, adjusting the gain applied to one of the first tap signal and the second tap signal includes selecting pixel pairs, each pair including a pixel from the first segment within the region of interest and a pixel from the second segment within the region of interest, calculating a difference in magnitude between tap signals of each pixel pair over the region of interest, and summing at least a portion of the differences in magnitude between tap signals of each pixel pair over the region of interest to generate an error term.

According to one embodiment, the method further comprises utilizing a PID control loop to generate a gain correction term based on the error term, and wherein adjusting the gain applied to one of the first tap signal and the second tap signal includes adjusting the gain based on the gain correction term. In one embodiment, utilizing a PID control loop to generate the gain correction term comprises integrating the error term over a prior period of time, applying an integral gain to the integrated error term to generate an integration control term, applying a proportional gain to the error term to generate a proportional control term, deriving a rate of change of the error term over time, applying a derivative gain to the rate of change to generate a derivative control term, and summing the integration control term, the proportional control term, and the derivative control term to generate a PID control term. In another embodiment, utilizing a PID control loop to generate the gain correction term further comprises adding the PID control term to a reference gain term to generate the gain correction term.

According to another embodiment, the method further comprises comparing the difference in magnitude between tap signals of each pixel pair to a gradient threshold, wherein summing at least a portion of the differences in magnitude between tap signals over the region of interest to generate an error term includes only summing differences in magnitude less than the gradient threshold. In another embodiment, selecting pixel pairs includes selecting pixel pairs from pixels of the same color in the first segment and the second segment.

According to one embodiment, the method further comprises monitoring motion of scene imagery captured by the multi-tap CCD camera, and adjusting the gain applied to one of the first tap signal and the second tap signal only when the scene imagery has moved by more than a scene motion threshold.

Another aspect in accord with the present invention is directed to a CCD camera, the CCD camera comprising a pixel array comprising a first segment including a first plurality of pixels, the first segment configured to produce a first tap signal responsive to receipt of electromagnetic radiation from a scene to be imaged, and a second segment including a second plurality of pixels, the second segment configured to produce a second tap signal responsive to receipt of the electromagnetic radiation from the scene, a processor coupled to the first and second segments and configured to receive a first readout from the first segment including the first tap signal, to receive a second readout from the second segment including the second tap signal, and to combine the first tap signals and the second tap signals, and means for reducing level and gain errors between the first readout and the second readout to one digital count or less.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a diagram of one example of a color-filtered pixel array of a two-tap readout CCD sensor according to aspects of the invention.

DETAILED DESCRIPTION

As described above, poor tap/channel matching between paths of a multi-tap CCD sensor may result in a "split screen" visual effect in a resulting image generated by the multi-tap CCD sensor. As also discussed above, prior attempts so address this problem have resulted in solutions with gain errors of at least several digital counts. Accordingly, aspects and embodiments described herein provide methods and apparatus for reducing level (offset) and gain error between readouts of a multi-readout (or multi-tap) CCD sensor to one digital count or less.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
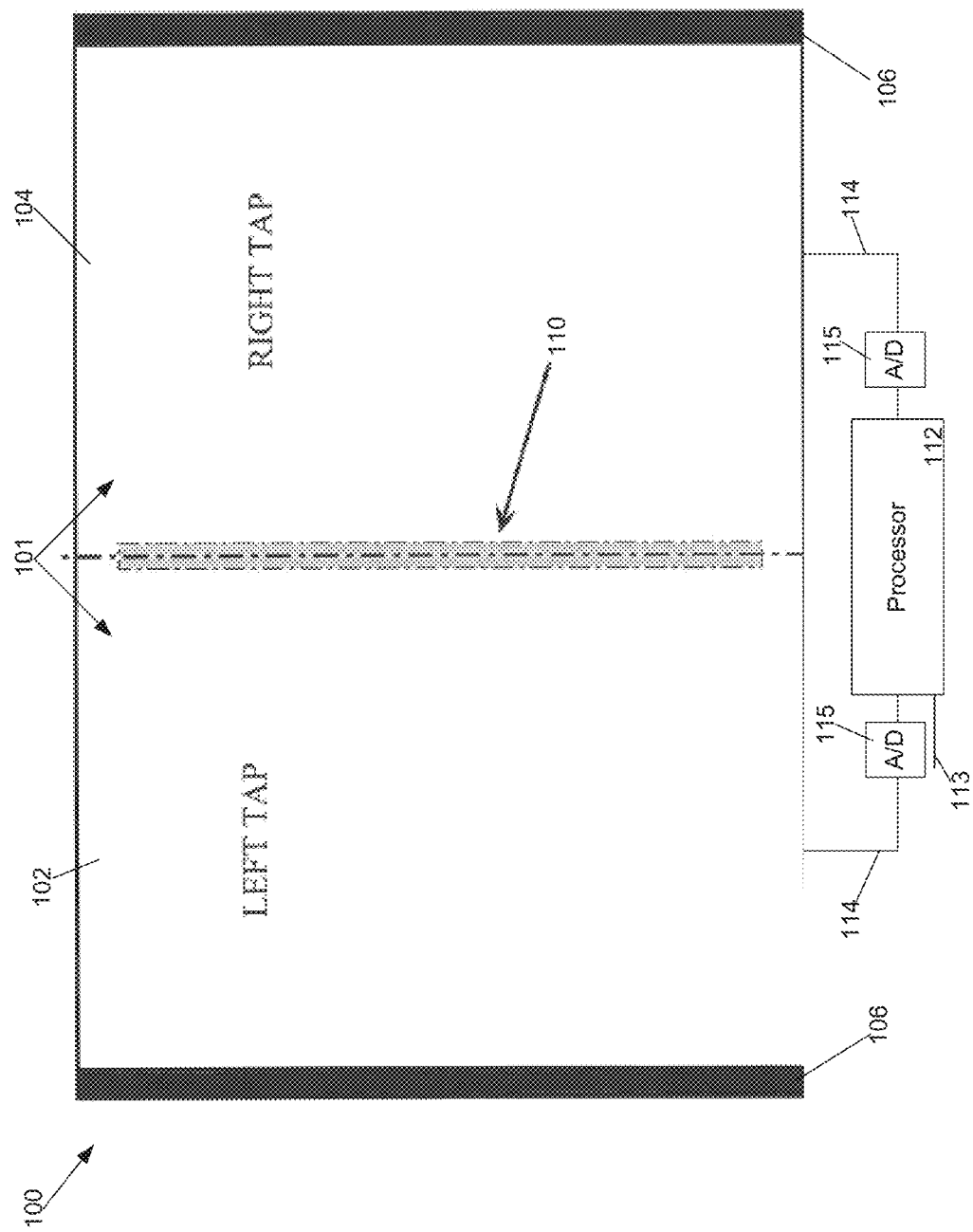
FIG. 1 is a diagram of one example of a two-tap readout CCD sensor with a gain correction region of interest according to aspects of the invention.

FIG. 1 illustrates one embodiment of a two-tap readout CCD sensor 100. The two-tap readout CCD sensor 100 includes an array of pixels 101 and a processor 112. According to one embodiment, the array of pixels 101 is a 2048× 2048 array of pixels; however, in other embodiments, the array of pixels 101 may be of any size. The array of pixels 101 includes a left segment of pixels 102 and a right segment of pixels 104, each coupled to the processor 112 via an electrical path 114 (e.g., a wire). According to one embodiment, each segment of pixels 102, 104 includes a 2048×1024 array of pixels; however, in other embodiments, the segments may include pixel arrays of any size. Each segment of pixels 102, 104 also includes a masked reference region 106. According to one embodiment, each masked reference region 106 includes 2048 rows of pixels, each row including 20 pixels; however, in other embodiments, the masked reference regions 106 may be of any size and may be configured differently. According to one embodiment, the masked reference region 106 of each segment of pixels 102, 104 is located on a left or right side edge of the corresponding segment 102, 104; however, in other embodiments, the reference region 106 may be located on a different portion of the segment 102, 104 (e.g., on a top or bottom edge) of pixels.

As light impinges on the pixel array 101, each segment 102, 104 captures image data that represents the light incident on the pixels of the segment 102, 104. Based on the captured image data, each segment 102, 104 generates tap signals representative of the light received by each segment 102, 104 at a given time. The tap signals are provided to the processor 112 via the paths 114. For example, in one embodiment, photo diodes within the left segment 102 of the pixel array 101 generate left tap signals representative of light received by pixels of the left segment 102 and photo diodes within the right segment 104 of the pixel array 101 generate right tap signals representative of the light received by pixels of the right segment 104. The left and right tap signals from each segment 102, 104 of the pixel array 101 are provided to the processor 112 via separate paths 114 and represent the light received by each segment 102, 104 of the pixel array 101 at a given time. Black reference tap signals generated from the masked reference region 106 of each segment 102, 104 are also provided to the processor 112.

According to one embodiment, the CCD sensor 100 also includes at least one Analog to Digital (A/D) converter 115 coupled between the processor 112 and each segment of pixels 102, 104. The A/D converter(s) 115 receives analog tap signals from a segment of pixels 102, 104, converts the analog tap signals into digital tap signals, and provides the digital tap signals to the processor 112 for processing.

A gain correction Region Of Interest (ROI) 110 is defined in the CCD sensor 100 to include a portion of the left segment of pixels 102 adjacent the right segment 104 and a portion of the right segment of pixels 104 adjacent the left segment 102. In one embodiment, the ROI 110 is two pixel columns wide. In another embodiment, the ROI 110 is four pixel columns wide. In other embodiment, the ROI 110 may be defined as any pixel column width.

The processor operates on the tap signals (including the tap signals corresponding to the ROI 110 pixels and the black reference tap signals corresponding to the masked regions 106) received from each electrical path 114 (i.e., from each segment of pixels 102, 104) to generate a single image from the combination of the tap signals. The image may be provided to a display, memory, or some other external system. In generating the image, the processor 112 analyzes the received tap signals and calibrates the tap signals to reduce level (offset) and gain error between the tap signals of each segment 102, 104.

Figure 2:
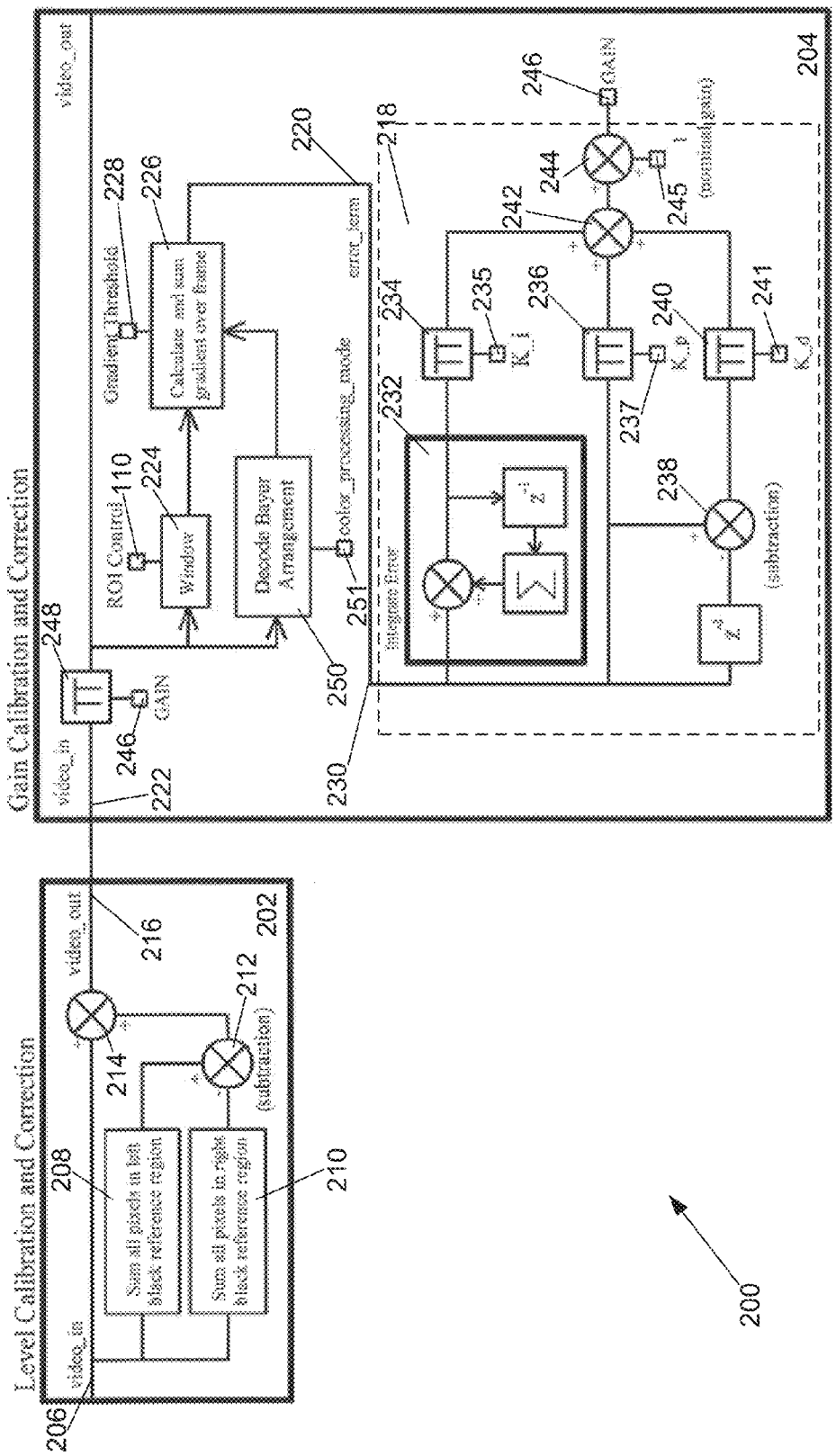
FIG. 2 is a block diagram illustrating one example of a two-tap readout CCD sensor level and gain calibration process according to aspects of the invention.

For example, FIG. 2 is a block diagram illustrating one example of a two-tap readout CCD sensor level and gain calibration process 200 which may be implemented by the processor 112. As shown in FIG. 2, the process 200 includes a two-stage control loop that actively performs a level correction stage 202 and then a gain correction stage 204. In the level correction stage 202, the reference tap signals corresponding to the masked reference regions 106 of each segment 102, 104 are compared to determine the level difference between the reference tap signals of the left segment 102 and the reference tap signals of the right segment 104. The reference tap signal levels of the segment 102 or 104 which generated the lower level reference tap signals are increased to match the reference tap signal levels of the other segment (i.e., the segment with the higher level reference tap signals). By matching the reference tap signal levels of the two segments, the inherent difference in reference tap signal levels (as seen in the level difference between the black reference tap signals of each segment 102, 104) may be compensated for.

For example, in the level correction stage 202, reference tap signals generated by each segment 102, 104 for the same period of time are received by the processor 112 (as indicated in block 206). The processor 112 sums the magnitude of all of the black reference tap signals corresponding to the masked reference region 106 of the left segment 102 (as indicated in block 208). The processor 112 sums the magnitude of all of the black reference tap signals corresponding to the masked reference region 106 of the right segment 104 (as indicated in block 210). The processor 112 calculates the difference between the summed magnitude of the black reference tap signals corresponding to the masked reference region 106 of the left segment 102 and the summed magnitude of the black reference tap signals corresponding to the masked reference region 106 of the right segment 104 (as indicated in block 212). The calculated magnitude difference is added to the tap signals of the segment 102 or 104 which initially generated the lower level black reference tap signals to increase the tap signal levels and match them with the tap signal levels of the other segment (as indicated in block 214). The tap signals from each segment 102, 104 (including the level adjusted tap signals) are provided to the gain correction stage 204 (as indicated in block 216).

As described above, the tap signal levels of the segment 102 or 104 which initially generated the lower level black reference tap signals are increased to match the tap signal levels of the other segment; however, in other embodiments, the tap signal levels of the segment 102 or 104 which initially generated the higher level black reference tap signals may be decreased to match the tap signal levels of the other segment.

As also described above, the sensor 100 includes masked reference regions 106 that generate black reference tap signals. However, in another embodiment, the masked reference regions 106 of the segments 102, 104 may be removed and the sensor 100 may instead be shuttered to generate black reference tap signals from any portion of each segment of pixels 102, 104.

In the gain correction stage 204, tap signals associated with the ROI 110 are analyzed and based on this analysis (described in greater detail below), the gain applied to tap signals of a segment 102, 104 by the processor 112 may be adjusted to reduce the gain error between the tap signals of the segments 102, 104. For example, in one embodiment, the gain correction is implemented as a PID controller 218 which accepts as its input the absolute value of an error term between the two segments 102, 104. This error term, referred to herein as the error gradient term, is generated by calculating the difference in magnitude (i.e., a gradient) between tap signals of pixel pairs (between the two segments 102, 104) and summing this magnitude over all pixel pairs within the ROI 110. A multiplicative gain correction term is generated at the output of the PID controller, and then applied to subsequent frames of pixel information (i.e., tap signals) from a segment 102, 104 to adjust the gain applied to tap signals of the segment 102, 104 and reduce the gain error between the tap signals of the segments 102, 104. The control loop may be run continuously, or may be stopped when the error term is less than a defined threshold.

For instance, as shown in the gain correction stage 204 of FIG. 2, tap signals from each segment 102, 104 (including any level adjusted tap signals) are received from the level correction stage 202 (as indicated in block 222). The processor 112 analyzes tap signals associated with pixels within the ROI 110 and identifies pixel pairs between the first segment 102 and the second segment 104 in the ROI 110 (as indicated in block 224). According to one embodiment, each pixel pair includes one pixel chosen from the ROI 110 within the first segment 102 and a pixel chosen from the ROI 110 within the second segment 102. The processor 112 calculates the difference in magnitude between the tap signals of each pixel pair and sums each difference across the ROI 110 (as indicated in block 226). The resulting sum of differences between each pixel pair is the error gradient term 220.

One aspect to be accounted for in determining the appropriate error gradient term 220 is filtering out scene information from sensor tap imbalance. Large-magnitude gradients occurring within the ROI 110 are capable of contaminating the resulting error gradient term 220. For example, if an object is sensed in the right segment's 104 portion of the ROI 110 but is not sensed in the corresponding left segment's 102 portion of the ROI 110 (i.e., in only one pixel of a pixel pair), the difference in magnitude between the tap signals of the pixel pair would be relatively high due to the presence of the object in half the scene and not because of a difference in gain. This relatively large difference in magnitude would contribute to the calculation of the error gradient term 220 and would result in the error gradient term 220 being erroneously high.

Therefore, according to certain embodiments, the processor operates on active scene data and rejects large gradient inputs within the ROI 110. In one embodiment, by thresholding the error gradient term 220, the effects of scene information may be filtered out from the error gradient term 220 calculation. For example, as indicated at block 226, upon calculating the difference in magnitude (i.e., the gradient) between the tap signals of each pixel pair across the ROI 110, the processor 112 also compares the difference in magnitude between the tap signals of each pixel pair to a gradient threshold 228. If a difference in magnitude between the tap signals of a pixel pair is greater than the gradient threshold 228, then the processor 112 will not utilize the difference in magnitude in the summing of the differences in magnitude. Accordingly, pixel pairs with corresponding tap signals having a magnitude difference greater than the gradient threshold do not contribute to the calculation of the error gradient term 220 that is fed to the PID controller 218. This thresholding may limit the impact of scene-based gradients when calculating the error gradient term 220.

The error gradient term 220 is provided to the PID controller 218 (as indicated in block 230). The PID controller 218 integrates the error gradient term 220 over a prior period of time and at step 234 the integrated error gradient term is multiplied by a constant integral term coefficient (K_i) 235 (as indicated in block 232). The PID controller 218 also multiples the current error gradient term 220 by a constant proportional term coefficient (K_p) (as indicated in block 236). The PID controller 218 further derives the rate of change of the error gradient term 220 over time (as indicated in block 238). The rate of change is multiplied by a constant derivative term coefficient (K_d) 241 (as indicated in block 240). The integrated error gradient term multiplied by K_i 235, the current error gradient term 220 multiplied by K_p 237, and the rate of change of the error gradient term multiplied by K_d 241 are summed together to generate a PID control term (as indicated in block 242). The PID control term is combined with a reference (or nominal) gain term 245 to generate a gain correction term 246 (as indicated in block 244).

The gain correction term 246 is applied to subsequent tap signals from a segment 102, 104 of the pixel array 101 to adjust the gain applied to tap signals of the segment 102, 104 and reduce the gain error between the tap signals of the segments 102, 104 (as indicated in block 248). According to one embodiment, the gain correction term 246 is applied to tap signals of a segment 102, 104 that currently has a gain which must be increased to match the gain of the other segment 102, 104. In such an embodiment, the gain correction term increases the gain applied to tap signals of the lower gain segment 102, 104. According to another embodiment, the gain correction term 246 is applied to tap signals of a segment 102, 104 that currently has a gain which must be decreased to match the gain of the other segment 102, 104. In such an embodiment, the gain correction term decreases the gain applied to tap signals of the higher gain segment 102, 104.

According to one embodiment, the gain control stage 204 may run continuously to match the gains of the two segments 102, 104. However, in another embodiment, the gain control stage 204 may be stopped when the error gradient term 220 is less than a defined minimum threshold.

According to another embodiment, by using knowledge of system motion of the sensor 100, the gain control stage 204 may be selectively enabled only when scene motion is large enough to ensure new samples within the ROI 110 in subsequent iterations of the control loop. For example, a situation may arise where a non-moving object (e.g., a corner of a building) is sensed in the right segment's 104 portion of the ROI 110 but not in the corresponding left segment's 102 portion of the ROI 110. If the gain control stage 204 continuously attempts to perform its gain adjustment process with an error gradient term based on a large magnitude gradient resulting from the continuous sensing of the non-moving object in only one half of the ROI 110, the resulting error gradient term would continue to be erroneously high and proper gain matching of the segments 102, 104 would not occur.

Accordingly, if the gain control stage 204 is selectively enabled only when scene motion is large enough (i.e., above a scene motion threshold) to ensure new samples within the ROI 110, such a situation may be avoided as the gain control stage 202 would only be enabled when adequate motion of the sensor 100 resulted in new samples within the ROI 110 and continuous attempts at gain calibration based on the same non-moving object would not occur.

For example, in one embodiment, the processor 112 includes a motion control input 113 that is configured to be coupled to a motion control system that controls and/or senses the motion of the sensor 100. For example, the motion control system may include a gyroscope, a servomechanism, a positioning system (e.g., a GPS), a motor, a pump, an actuator, or any other device or system common in a motion control system.

According to one embodiment, the motion control system controls the motion of the sensor itself 100 (e.g., via an actuator, motor, servomechanism, etc) and provides information regarding the motion of the sensor 100 to the processor 112 via the motion control input 113. In another embodiment, the motion control system merely monitors the motion of the sensor 100 (e.g., as the sensor 100 is moved by a user or the area to which the sensor 100 is attached (e.g., a vehicle) moves) and provides the motion information of the sensor 100 to the processor 112. In one embodiment, the gain control stage 204 is only enabled when the processor 112 receives signals from a motion control system via the motion control input 113 that indicates that the scene imagery received by the sensor 100 (e.g. due to movement of the sensor 100 or the area to which the sensor 100 is attached) has moved an adequate amount (i.e., above a scene motion threshold such as 2 pixels).

Many traditional CCD sensors operate with color filters in the optical path. For example, a pixelated Bayer (red, green, blue) filter array may be placed in front of the CCD sensor 100. The Bayer color filter array (including multiple different colors) may further affect the calculation of the error gradient term 220. Therefore, according to at least one embodiment, the processor 112 may account for the presence of a color filter in the error gradient term calculations of the gain control stage 204.

For example, in the gain control stage 204, based on a color processing mode 251, the processor 112 may be configured to only utilize pixels (and corresponding tap signals) of a certain color from the pixel array 101 in its error gradient term calculation (as indicated in block 250). For instance, according to one embodiment, in a green color processing mode 251, only green pixels from the pixel array 101 are used by the processor 112 in the error gradient term 220 calculation.

For example, in a Bayer filtered pixel array 300 (as seen in FIG. 3), green pixels (each marked with an "X") cover fifty percent of the array 300. Therefore, for a ROI 110 having a width of two pixel columns, the green pixels 302 in adjacent rows may be used as the pixel pairs for the error gradient term 220 calculation. For a ROI 110 having a width of four pixel columns, the green pixels 304 of the same row may be used as the pixel pairs for the error gradient term 220 calculation. In other examples, pixels of colors other than green may be used, or different pixel pairs may be selected for the error gradient term 220 calculation. Additionally, although the process may be simplified by using only pixels of a single color, other embodiments may use all pixels or pixels of more than one color.

As described above, the level and gain calibration process is utilized with a two-tap (i.e., segment) CCD sensor; however, in other embodiments, the CCD sensor may include any number of taps or segments.

As also described above, the pixel array 101 is split into two half segments 102, 104; however, in other embodiments, the pixel array 101 may be divided in any other way and the segments 102, 104 may be defined in any other configuration.

As discussed above, level (offset) and gain errors between readouts of a multi-tap CCD camera may be reduced to one digital count or less. By measuring gradients at a tap seam between pixel pairs of a region of interest and summing the gradients, an error gradient term may be generated. The error gradient term is fed to a PID controller to produce a gain correction term that is used to adjust gain applied to pixels of a tap and to reduce gain error between taps. In addition, by rejecting large gradient inputs within the region of interest and/or selectively enabling gain adjustment only when scene motion is large enough to ensure new samples within the region of interest, an error gradient term (and resulting gain correction term) may be achieved that results in gain errors of one digital count or less.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A Charge Coupled Device (CCD) sensor for capturing scene imagery, the CCD sensor comprising:
    a pixel array comprising:
        a first segment including a first plurality of pixels, the first segment configured to produce a first tap signal responsive to receipt of electromagnetic radiation from a scene to be imaged;
        a second segment including a second plurality of pixels, the second segment configured to produce a second tap signal responsive to receipt of the electromagnetic radiation from the scene;
        a region of interest including a portion of the first segment adjacent the second segment and a portion of the second segment adjacent the first segment; and
    a processor coupled to the first and second segments;
    wherein the processor is configured to receive the first tap signal from the first segment and the second tap signal from the second segment, perform level correction on one of the first tap signal and the second tap signal based on a magnitude of the first tap signal and a magnitude of the second tap signal, and perform gain correction on one of the first tap signal and the second tap signal based on a comparison between a magnitude of the first tap signal corresponding to the region of interest and a magnitude of the second tap signal corresponding to the region of interest;
    wherein the processor further includes a motion input line configured to be coupled to a motion system, and wherein the processor is further configured to receive motion signals from the motion system via the motion input line including information regarding motion of the scene imagery, and to perform gain correction of the one of the first tap signal and the second tap signal only when the motion signals indicate that the scene imagery has moved by more than a scene motion threshold.

2. The CCD sensor of claim 1, wherein the first segment includes a first reference region;
    wherein the second segment includes a second reference region; and
    wherein the processor is further configured to receive at least one first reference tap signal from the first reference region, to receive at least one second reference tap signal from the second reference region, and to perform the level correction of the one of the first tap signal and the second tap signal based on a comparison between a magnitude of the at least one first reference tap signal and a magnitude of the at least one second reference tap signal.

3. The CCD sensor of claim 2, wherein in performing the level correction of the one of the first tap signal and the second tap signal the processor is further configured to sum the magnitude of each first reference tap signal from the first reference region, sum the magnitude of each second reference tap signal from the second reference region, calculate a difference between the summed first reference tap signal magnitudes and the summed second reference tap signal magnitudes, and add the difference to the magnitude of the one of the first tap signal and the second tap signal.

4. The CCD sensor of claim 1, wherein in performing the gain correction of the one of the first tap signal and the second tap signal the processor is configured to select pixel pairs, each pair including a pixel from the first segment within the region of interest and a pixel from the second segment within the region of interest, calculate a tap signal magnitude gradient for each pixel pair, and sum at least a portion of the tap signal magnitude gradients over the region of interest to generate an error term.

5. The CCD sensor of claim 4, wherein the processor includes a Proportional-Integral-Derivative (PID) controller configured to generate a gain correction term based on the error term, and wherein the processor is further configured to adjust a gain of the one of the first tap signal and the second tap signal based on the gain correction term.

6. The CCD sensor of claim 4, wherein the processor is further configured to compare each tap signal magnitude gradient of each pixel pair to a gradient threshold, and to only sum tap signal magnitude gradients less than the gradient threshold to generate the error term.

7. The CCD sensor of claim 4, wherein the pixel array is color filtered, and wherein the processor is further configured to select the pixel pairs from pixels of the same color in the first and second segments.

8. The CCD sensor of claim 7, wherein the pixel array is Bayer color filtered.

9. A method of providing tap balance in a multi-tap CCD camera, the CCD camera comprising a pixel array including a first segment including a first plurality of pixels, a second segment including a second plurality of pixels, and a region of interest including a portion of the first segment adjacent the second segment and a portion of the second segment adjacent the first segment, the method comprising:
    receiving a readout from the first segment including a first tap signal representative of electromagnetic radiation received by the first segment from a scene to be imaged;
    receiving a readout from the second segment including a second tap signal representative of electromagnetic radiation received by the second segment from the scene;
    adjusting a magnitude of the first tap signal based on a magnitude of the second tap signal;
    adjusting a gain applied to one of the first tap signal and the second tap signal based on a comparison between a magnitude of the first tap signal corresponding to the region of interest and a magnitude of the second tap signal corresponding to the region of interest; and
    monitoring motion of scene imagery captured by the multi-tap CCD camera, and adjusting the gain applied to one of the first tap signal and the second tap signal only when the scene imagery has moved by more than a scene motion threshold.

10. The method of claim 9, wherein receiving a readout from the first segment includes receiving at least one first reference tap signal;
   wherein receiving a readout from the second segment includes receiving at least one second reference tap signal; and
   wherein adjusting the magnitude of the first tap signal includes adjusting the magnitude of the first tap signal based on a comparison between a magnitude of the at least one first reference tap signal and a magnitude of the at least one second reference tap signal.

11. The method of claim 10, wherein adjusting the magnitude of the first tap signal further includes:
   summing the magnitude of each first reference tap signal;
   summing the magnitude of each second reference tap signal;
   calculating a level difference between the summed first reference tap signal magnitudes and the summed second reference tap signal magnitudes; and
   adding the level difference to the magnitude of the first tap signal.

12. The method of claim 9, wherein adjusting the gain applied to one of the first tap signal and the second tap signal includes:
   selecting pixel pairs, each pair including a pixel from the first segment within the region of interest and a pixel from the second segment within the region of interest;
   calculating a difference in magnitude between tap signals of each pixel pair over the region of interest; and
   summing at least a portion of the differences in magnitude between tap signals of each pixel pair over the region of interest to generate an error term.

13. The method of claim 12, further comprising utilizing a PID control loop to generate a gain correction term based on the error term, and wherein adjusting the gain applied to one of the first tap signal and the second tap signal includes adjusting the gain based on the gain correction term.

14. The method of claim 13, wherein utilizing a PID control loop to generate the gain correction term comprises:
   integrating the error term over a prior period of time;
   applying an integral gain to the integrated error term to generate an integration control term;
   applying a proportional gain to the error term to generate a proportional control term;
   deriving a rate of change of the error term over time;
   applying a derivative gain to the rate of change to generate a derivative control term; and
   summing the integration control term, the proportional control term, and the derivative control term to generate a PID control term.

15. The method of claim 14, wherein utilizing a PID control loop to generate the gain correction term further comprises adding the PID control term to a reference gain term to generate the gain correction term.

16. The method of claim 12, further comprising comparing the difference in magnitude between tap signals of each pixel pair to a gradient threshold, wherein summing at least a portion of the differences in magnitude between tap signals over the region of interest to generate an error term includes only summing differences in magnitude less than the gradient threshold.

17. The method of claim 12, wherein selecting pixel pairs includes selecting pixel pairs from pixels of the same color in the first segment and the second segment.

18. A CCD camera, the CCD camera comprising:
   a pixel array comprising:
      a first segment including a first plurality of pixels, the first segment configured to produce a first tap signal responsive to receipt of electromagnetic radiation from a scene to be imaged;
      a second segment including a second plurality of pixels, the second segment configured to produce a second tap signal responsive to receipt of the electromagnetic radiation from the scene;
      a region of interest including a portion of the first segment adjacent the second segment and a portion of the second segment adjacent the first segment; and
      a processor coupled to the first and second segments, the processor being configured to receive the first tap signal from the first segment and the second tap signal from the second segment, perform level correction on one of the first tap signal and the second tap signal based on a magnitude of the first tap signal and a magnitude of the second tap signal, and perform gain correction on one of the first tap signal and the second tap signal based on a comparison between a magnitude of the first tap signal corresponding to the region of interest and a magnitude of the second tap signal corresponding to the region of interest;
   wherein in performing the gain correction of the one of the first tap signal and the second tap signal the processor is configured to select pixel pairs, each pair including a pixel from the first segment within the region of interest and a pixel from the second segment within the region of interest, calculate a tap signal magnitude gradient for each pixel pair, and sum at least a portion of the tap signal magnitude gradients over the region of interest to generate an error term; and
   wherein the processor includes a Proportional-Integral-Derivative (PID) controller configured to generate a gain correction term based on the error term, and wherein the processor is further configured to adjust a gain of the one of the first tap signal and the second tap signal based on the gain correction term.

19. The CCD sensor of claim 18, wherein the processor is further configured to compare each tap signal magnitude gradient of each pixel pair to a gradient threshold, and to only sum tap signal magnitude gradients less than the gradient threshold to generate the error term.

20. The CCD sensor of claim 18, wherein the pixel array is color filtered, and wherein the processor is further configured to select the pixel pairs from pixels of the same color in the first and second segments.

21. A method of providing tap balance in a multi-tap CCD camera, the CCD camera comprising a pixel array including a first segment including a first plurality of pixels, a second segment including a second plurality of pixels, and a region of interest including a portion of the first segment adjacent the second segment and a portion of the second segment adjacent the first segment, the method comprising:
   receiving a readout from the first segment including a first tap signal representative of electromagnetic radiation received by the first segment from a scene to be imaged;
   receiving a readout from the second segment including a second tap signal representative of electromagnetic radiation received by the second segment from the scene;
   adjusting a magnitude of the first tap signal based on a magnitude of the second tap signal; and
   generating an error term based on a comparison between a magnitude of the first tap signal corresponding to the region of interest and a magnitude of the second tap signal corresponding to the region of interest;

utilizing a PID control loop to generate a gain correction term based on the error term; and adjusting a gain applied to one of the first tap signal and the second tap signal based on the gain correction term;

wherein utilizing a PID control loop to generate the gain correction term comprises:

integrating the error term over a prior period of time;

applying an integral gain to the integrated error term to generate an integration control term;

applying a proportional gain to the error term to generate a proportional control term;

deriving a rate of change of the error term over time;

applying a derivative gain to the rate of change to generate a derivative control term; and summing the integration control term, the proportional control term, and the derivative control term to generate a PID control term.

22. The method of claim 21, wherein generating an error term comprises:

selecting pixel pairs, each pair including a pixel from the first segment within the region of interest and a pixel from the second segment within the region of interest;

calculating a difference in magnitude between tap signals of each pixel pair over the region of interest; and summing at least a portion of the differences in magnitude between tap signals of each pixel pair over the region of interest to generate the error term.

23. The method of claim 22, wherein utilizing a PID control loop to generate the gain correction term further comprises adding the PID control term to a reference gain term to generate the gain correction term.

24. The method of claim 22, further comprising comparing the difference in magnitude between tap signals of each pixel pair to a gradient threshold, wherein summing at least a portion of the differences in magnitude between tap signals over the region of interest to generate an error term includes only summing differences in magnitude less than the gradient threshold.

25. The method of claim 22, wherein selecting pixel pairs includes selecting pixel pairs from pixels of the same color in the first segment and the second segment.

* * * * *